US012022545B2

United States Patent
Afzal et al.

(10) Patent No.: US 12,022,545 B2
(45) Date of Patent: Jun. 25, 2024

(54) DYNAMIC PCRF/PCF SELECTION

(71) Applicant: T-Mobile USA, Inc., Bellevue, WA (US)

(72) Inventors: Muhammad W. Afzal, Bellevue, WA (US); Suliman Albasheir, Sammamish, WA (US); Swetha Gopisetti, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 58 days.

(21) Appl. No.: 16/940,295

(22) Filed: Jul. 27, 2020

(65) Prior Publication Data

US 2022/0030656 A1 Jan. 27, 2022

(51) Int. Cl.
*H04L 65/1073* (2022.01)
*H04L 65/1104* (2022.01)
*H04M 3/42* (2006.01)
*H04M 7/00* (2006.01)
*H04M 7/12* (2006.01)
*H04M 15/00* (2006.01)
*H04W 4/16* (2009.01)
*H04W 8/06* (2009.01)
*H04W 8/12* (2009.01)
*H04W 8/26* (2009.01)
*H04W 36/00* (2009.01)
*H04W 76/11* (2018.01)
*H04W 76/16* (2018.01)

(52) U.S. Cl.
CPC ............ *H04W 76/16* (2018.02); *H04M 3/42* (2013.01); *H04M 7/006* (2013.01); *H04M 7/1235* (2013.01); *H04M 15/66* (2013.01); *H04W 4/16* (2013.01); *H04W 36/0022* (2013.01)

(58) Field of Classification Search
CPC ............ H04L 65/1006; H04L 12/1407; H04L 65/083; H04L 61/2007; H04L 12/14; H04L 61/3085; H04L 65/1073; H04L 65/1066; H04L 65/1045; H04M 15/66; H04M 7/1235; H04M 15/8228; H04W 12/72
USPC .......................................... 370/252
See application file for complete search history.

(56) References Cited

U.S. PATENT DOCUMENTS 10,455,637 B1* 10/2019 Youtz ................. H04W 60/005
2015/0172471 A1* 6/2015 Castro Castro ..... H04L 67/1036
370/329

(Continued)

*Primary Examiner* — Khaled M Kassim
*Assistant Examiner* — Jason A Harley
(74) *Attorney, Agent, or Firm* — Foley IP Law, PLLC (57) ABSTRACT

A solution for initiating a network session (e.g., a voice call) for a user equipment (UE) on a network includes: receiving a session initiation message at a first network node; appending, to the session initiation message, an identification of a policy node; passing the appended session initiation message to a session management node; selecting, by the session management node, the identified policy node; and based at least upon selecting the identified policy node, initiating the network session for the UE. This improves call setup reliability by reducing the risk that an error in the subscriber information at the session management node (e.g., proxy-call session control function (P-CSCF)) indicates the incorrect policy node (e.g., policy and charging rule function (PCRF) or policy charging function (PCF)). In some examples, the session initiation message may comprise a session initiation protocol (SIP) message.

20 Claims, 5 Drawing Sheets

(56) References Cited

U.S. PATENT DOCUMENTS

| | | | |
|---|---|---|---|
| 2018/0199398 A1* | 7/2018 | Dao | H04W 76/27 |
| 2018/0309800 A1* | 10/2018 | Aravamudhan | H04M 15/57 |
| 2019/0044980 A1* | 2/2019 | Russell | H04W 8/06 |
| 2019/0246282 A1* | 8/2019 | Li | H04W 12/041 |
| 2020/0068385 A1* | 2/2020 | Yu | H04W 48/16 |
| 2020/0112892 A1* | 4/2020 | Shi | H04W 48/16 |
| 2020/0178336 A1* | 6/2020 | Li | H04L 65/1045 |
| 2020/0280511 A1* | 9/2020 | Gapin | H04L 67/141 |
| 2020/0374323 A1* | 11/2020 | Zhang | H04L 65/40 |
| 2021/0152615 A1* | 5/2021 | Karampatsis | H04W 40/22 |
| 2021/0204104 A1* | 7/2021 | Zhang | H04W 8/08 |
| 2021/0226838 A1* | 7/2021 | Hegarty | H04L 41/0213 |

\* cited by examiner

DYNAMIC PCRF/PCF SELECTION

BACKGROUND

A user equipment (UE, e.g., a cellphone) will have a session with a specific one of a plurality of policy nodes on a cellular network that controls network policy decisions such as data packet routing protocols. When the UE initiates a voice call, during call setup in 4G and 5G, a network node that manages sessions for the UE needs to select that same policy node, rather than another one of the other plurality of policy nodes, or else the call setup will fail. As an example for 4G cellular, Gx messages from the data network gateway (PGW) and Rx messages from the proxy-call session control function (P-CSCF) node should both reach the same policy and charging rule function (PCRF) node. As an example for 5G cellular, N7 messages from the session management function (SMF) node and Rx messages from the P-CSCF node should both reach the same policy charging function (PCF) node. Currently, each network node makes its own configuration information, for example the PGW or SMF has its own configuration and the P-CSCF also has its own configuration information. Unfortunately, this arrangement introduces the risk that configuration information being incorrect or incomplete (e.g., the PGW or SMF selects a different PRCF or PCF than the P-CSCF selects) may affect the reliability of call setup.

SUMMARY

The following summary is provided to illustrate examples disclosed herein, but is not meant to limit all examples to any particular configuration or sequence of operations.

A solution for initiating a network session (e.g., a voice call) for a user equipment (UE) on a network includes: receiving a session initiation message at a first network node; appending, to the session initiation message, an identification of a policy node; passing the appended session initiation message to a session management node; selecting, by the session management node, the identified policy node; and based at least upon selecting the identified policy node, initiating the network session for the UE. This improves call setup reliability by reducing the risk that an error in the subscriber information at the session management node (e.g., proxy-call session control function (P-CSCF)) indicates the incorrect policy node (e.g., policy and charging rule function (PCRF) or policy charging function (PCF)). In some examples, the first network node may comprise a packet data network gateway (PGW) or a session management function (SMF) node, and the receiving, appending, and passing operations are performed by a user plane component (PGW-U) or user plane function (UPF). In some examples, the selecting and initiating operations are performed by a P-CSCF. In some examples, the session initiation message may comprise a session initiation protocol (SIP) message.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for initiating a network session (e.g., a voice call) for a user equipment (UE) on a network includes: receiving a session initiation message at a first network node; appending, to the session initiation message, an identification of a policy node; passing the appended session initiation message to a session management node; selecting, by the session management node, the identified policy node; and based at least upon selecting the identified policy node, initiating the network session for the UE. This improves call setup reliability by reducing the risk that an error in the subscriber information at the session management node (e.g., proxy-call session control function (P-CSCF)) indicates the incorrect policy node (e.g., policy and charging rule function (PCRF) or policy charging function (PCF)). In some examples, the first network node may comprise a packet data network gateway (PGW) or a session management function (SMF) node, and the receiving, appending, and passing operations are performed by a user plane component (PGW-U) or user plane function (UPF). In some examples, the selecting and initiating operations are performed by a P-CSCF. In some examples, the session initiation message may comprise a session initiation protocol (SIP) message.

Aspects of the disclosure improve the reliability of cellular voice call setup by overcoming potential differences (e.g., due to errors and/or gaps) in the identification of the policy node (PCRF or PCF) between the first network node (PGW or SMF) and the session management node. This is accomplished by the first network node appending an identification of a policy node in a session initiation message to the session management node, for example by inserting a header element.

Figure 1:
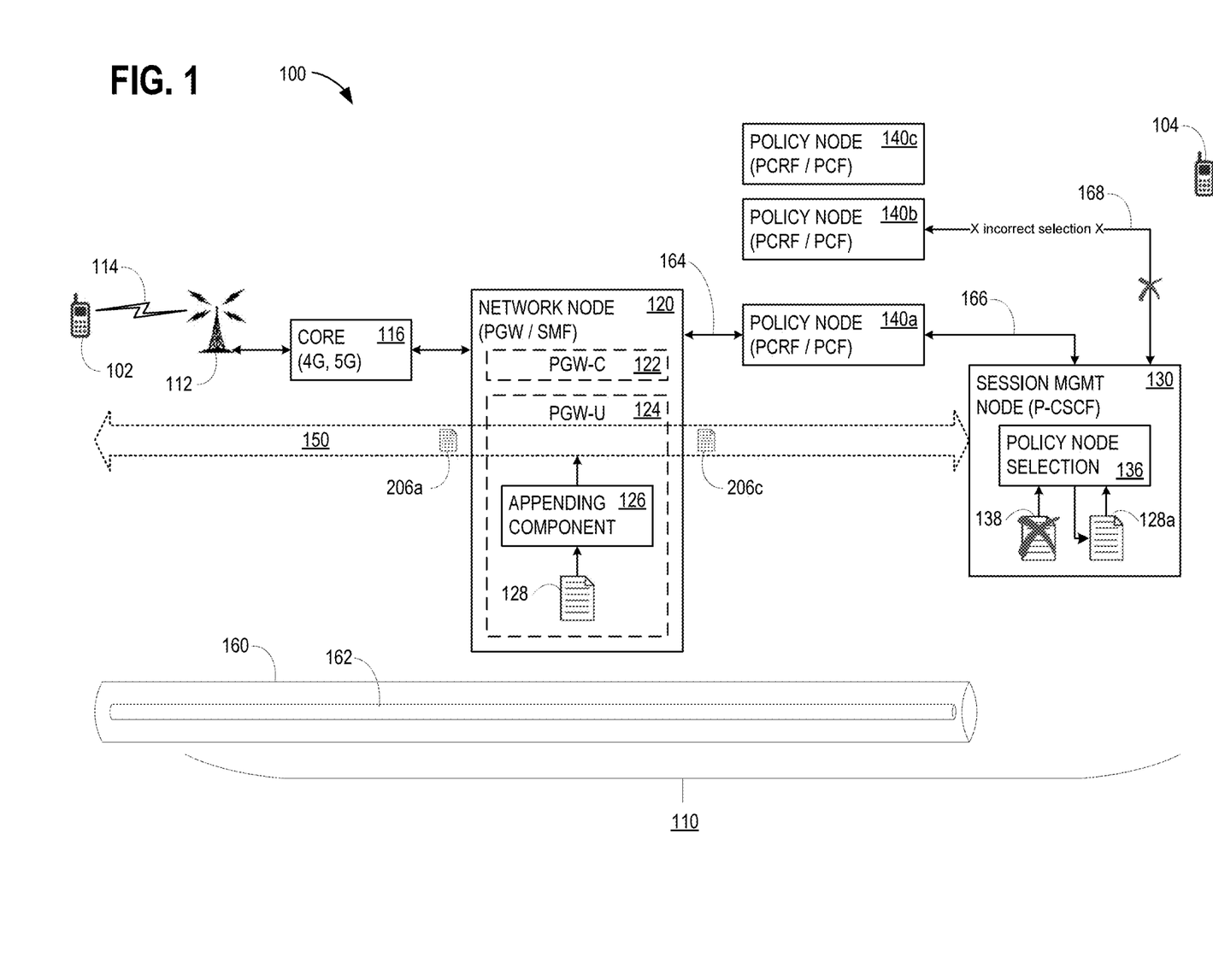
FIG. 1 illustrates an exemplary arrangement that may advantageously initiate a network session for a user equipment (UE) on a network, using dynamic policy and charging rule function (PCRF) or policy charging function (PCF) selection.

With reference now to the figures, FIG. 1 illustrates an exemplary arrangement 100 that may advantageously initiate a network session for a UE 102 (e.g., a cellular phone) on a network 110 (e.g., a cellular network), using dynamic PCRF or PCF selection. In arrangement 100, UE 102 is attempting to make a voice call to a UE 104 using network 110, which requires initiating a network session for UE 102 on network 110. Network 110 may be a fourth generation (4G) network, a fifth generation (5G) network, or another type of network. In some examples, the network session comprises a voice call. In some 4G examples, the network session comprises a voice over long term evolution (VOLTE) call. In some 5G examples, the network session comprises a voice over new radio (VONR) call.

Network 110 includes a radio access network (RAN) 112, a core 116, a first network node 120, a session management node 130, and a plurality of policy nodes 140a, 140b and 140c. UE 102 communicates with RAN 112 over an air interface 114. Core 116 contains the functionality necessary to support a 4G, 5G, or other network. As an example, core 116 may include a user plane function (UPF) that performs packet routing and forwarding, interconnection to data networks, policy enforcement, and data buffering. In some examples, network node 120 comprises a PGW for 4G or an SMF node for 5G. A PGW provides connectivity between UE 102 and external packet data networks. In some examples, a PGW may be separated into a control plane component, PGW-C 122, and a user plane component, PGW-U 124). An SMF manages protocol data unit (PDU) sessions and session context with the UPF of a 5G version of core 116. Session management node 130 may comprise a P-CSCF node, which acts as a SIP proxy. SIP is a signaling protocol used for setting up, connecting, and disconnecting communication sessions, such as voice or video calls. SIP signaling 150 passes from UE 102 to session management node 130, via network node 120.

Network node 120 connects to a policy node 140a over a connection 164. In some examples, policy node 140a comprises a PRCF node for 4G or a PCF node for 5G. A PRCF provides policy control decisions and flow based charging controls, such as determining how service data flow is handled and ensuring that the user plane traffic mapping and treatment is in accordance with a user profile (e.g., a profile for UE 102). A PCF governs control plane functions via policy rules and user plane functions via policy enforcement, and enables management of the network behavior (e.g., behavior of network 110). In some examples, connection 164 is a Gx interface for 4G or an N7 interface for 5G. A Gx interface between the PCRF and the PGW, allowing the PCRF direct control over the policy enforcement functions of the PGW. An N7 interface includes similar functionality.

To initiate the session for UE 102, session management node 130 also connects to the same policy node 140a, rather than another policy node 140b or 140c, although using a connection 166. In some examples, connection 166 is an Rx interface. An Rx interface allows a PCRF to request (from a policy node) the application of an appropriate policy for a session. If session management node 130 connects to the incorrect policy node, e.g., session management node 130 connects to policy node 140b (rather than policy node 140a), with a connection 168, the session initiation (e.g., call setup) will fail for UE 102. In some examples, UE 102 and session management node 130 will be in communication with a default session 160, and the session that is initiated for a voice call is a dedicated session 162 within default session 160. For voice calls, dedicated session 162 may be a guaranteed bit rate (GBR) session.

Figure 2:
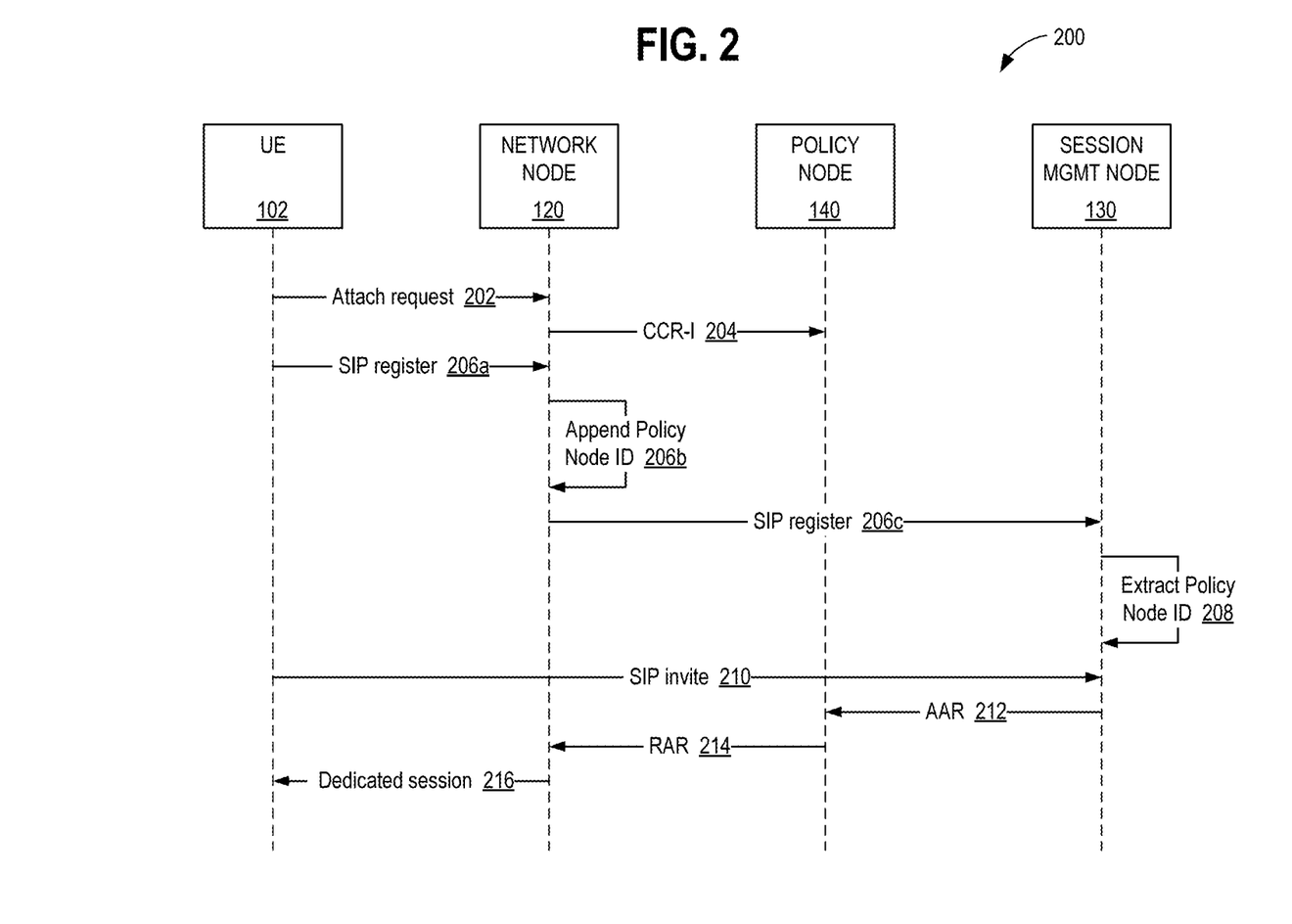
FIG. 2 illustrates a messaging sequence that may be used within the arrangement of FIG. 1.
Figure 3:
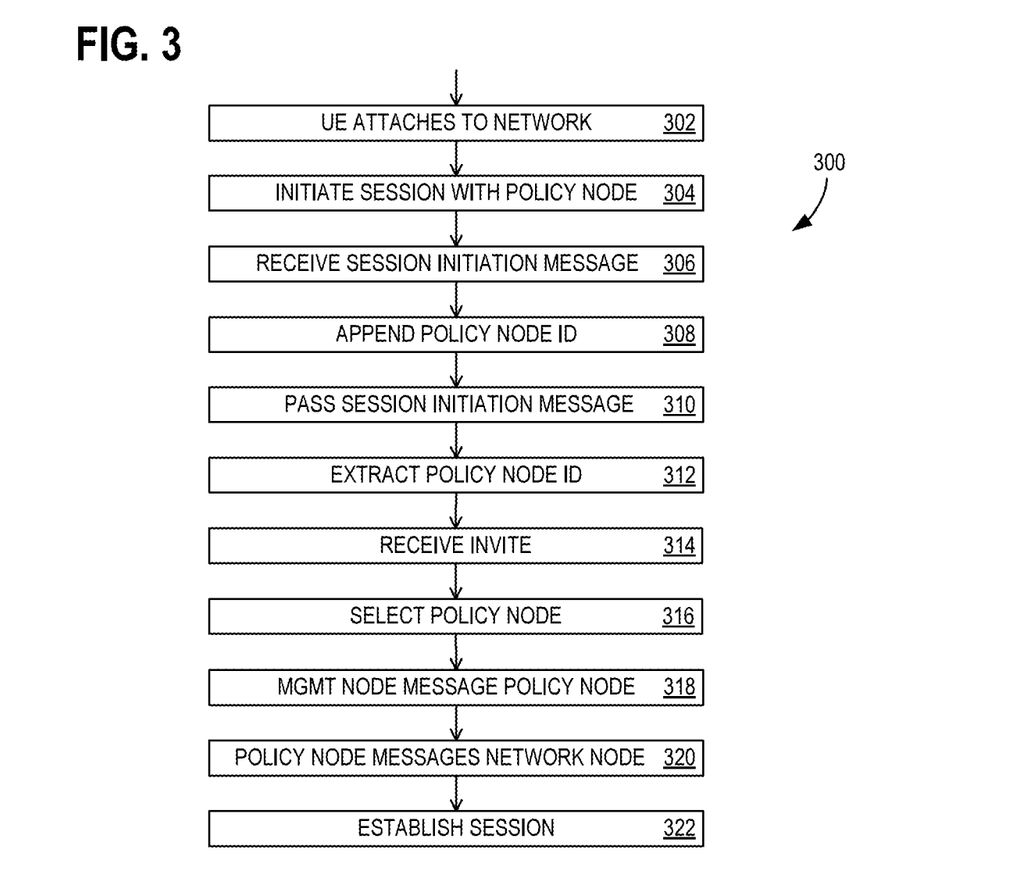
FIG. 3 illustrates a flow chart of exemplary operations associated with initiating a network session for a UE on a network that is advantageously employing dynamic PCRF/PCF selection.

Further description of FIG. 1 will be made with additional reference to FIGS. 2 and 3. FIG. 2 is a messaging sequence diagram 200 that shows a series of messages may be used within arrangement 100, and is described in conjunction with FIG. 3. FIG. 3 illustrates a flow chart 300 of exemplary operations associated with initiating a network session for UE 102 on network 110, and the messages of messaging sequence diagram 200 occur during various operations of flow chart 300. In some examples, at least a portion of messaging sequence diagram 200 and at least a portion of flow chart 300 may each be performed using one or more computing devices 500 of FIG. 5. FIGS. 1-3 should be viewed together.

In operation 302 (see FIG. 3), UE 102 sends an attach request 202 (see FIG. 2) to network node 120. At 304, network node 120 initiates a session with policy node 140a with a message 204, over connection 164. Network node 120 selects policy node 140a based on policy node identification 128, which is part of the configuration information in network node 120. In some examples, message 204 comprises an initial credit-control-request (CCR-I). In some examples, message 204 comprises a Gx or N7 message, and network node 120 communicates with policy node 140a using a Gx or N7 interface.

At 306, UE 102 sends a session initiation message 206a (e.g., a SIP registration message) to session management node 130 to inform session management node 130 of its location on network 110 (e.g., the serving component of RAN 112). However, session initiation message 206a passes through network node 120. Thus, operation 306 includes receiving session initiation message 206a at network node 120. In some examples, receiving session initiation message 208a comprises receiving session initiation message 208a from UE 102. In some examples, session initiation message 206a comprises a SIP message.

Operation 308 includes appending, to session initiation message 206a, identification 128 of policy node 140a. In some examples, this is performed by network node 120. This is accomplished, in some examples, by message 206b inserting identification 128 into a header of session initiation message 208a, thereby producing appended session initiation message 206c. In some examples, appending, to session initiation message 208a, identification 128 of policy node 140a comprises appending by network node 120. In some examples, an appending component 126 at network node 120 performs this task. In some examples, identification 128 comprises an internet protocol (IP) address or a fully qualified domain name (FQDN). Operation 310 includes passing appended session initiation message 206c to session management node 130.

At 312, session management node 130 extracts identification 128 from appended session initiation message 206c as extracted identification 128a (message 208). In some examples, session management node 130 decodes the header element inserted (appended) by network node 120. In some examples, session management node 130 uses a policy node selection component 136 for this task.

At 314, UE 102 attempts to initiate a session, for example when an operator of UE 102 attempts to make a voice call to UE 104. Thus, operation 314 includes the session management node 130 receiving a session invitation message 210. In some examples, session invitation message 210 comprises a SIP invite request, which is delivered to UE 104. Operation 316 includes selecting, by session management node 130, identified policy node 140a, in accordance with extracted identification 128a. This process precludes reliance of session management node 130 on configuration information 138 which, if incorrect, might have resulted in session management node 130 making an incorrect connection 168 to policy node 140b. The incorrect selection of policy node 140b (based on configuration information 138) would have resulted in failure of the session initiation (e.g., voice call setup).

At 318, session management node 130 sends a message 212 to policy node 140b, for example using connection 166. In some examples, message 212 comprises an automated alternate routing (AAR) message. AAR enables the establishment of an alternate path in the event that the preferred path between two intra-cluster endpoints lacks sufficient bandwidth. In some examples, message 212 comprises an Rx message. At 320, policy node 140a sends a message 214 to network node 120. In some examples, message 214 comprises a resource allocation request (RAR), which assists in ascertaining whether requested resources successfully allocated. At 322, network node 120 establishes a dedicated session (e.g., dedicated session 162) with UE 102 using message 216. Together, operations 316-322 comprise, based at least upon selecting identified policy node 140a, initiating a network session (e.g., dedicated session 162) for UE 102.

Figure 4:
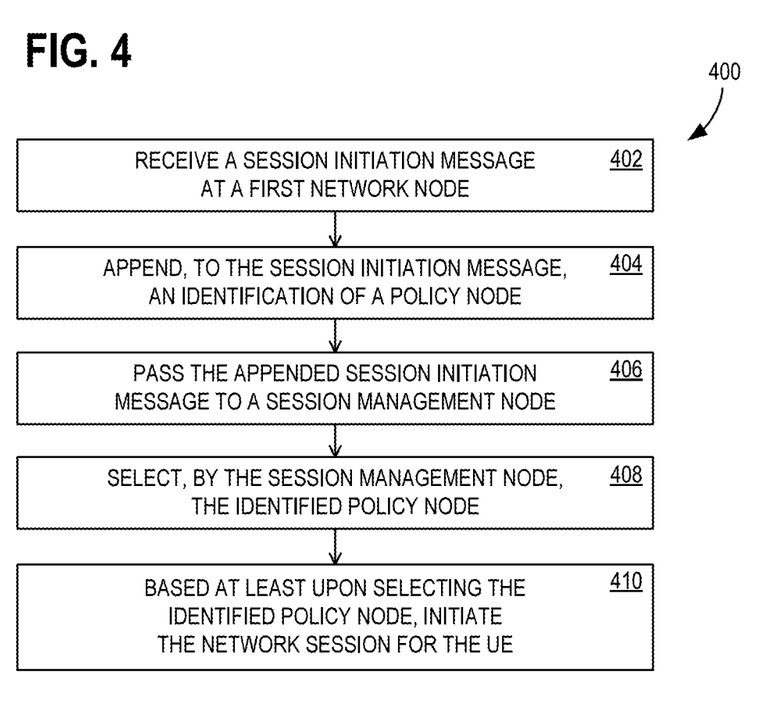
FIG. 4 illustrates another flow chart of exemplary operations associated with initiating a network session for a UE on a network that is advantageously employing dynamic PCRF/PCF selection.

FIG. 4 illustrates another flow chart of exemplary operations associated with initiating a network session for a UE on a network. In some examples, at least a portion of flow chart 400 may be performed using one or more computing devices 500 of FIG. 5. Operation 402 includes receiving a session initiation message at a first network node. Operation 404 includes appending, to the session initiation message, an identification of a policy node. Operation 406 includes passing the appended session initiation message to a session management node. Operation 408 includes selecting, by the session management node, the identified policy node. Operation 410 includes, based at least upon selecting the identified policy node, initiating the network session for the UE.

Figure 5:
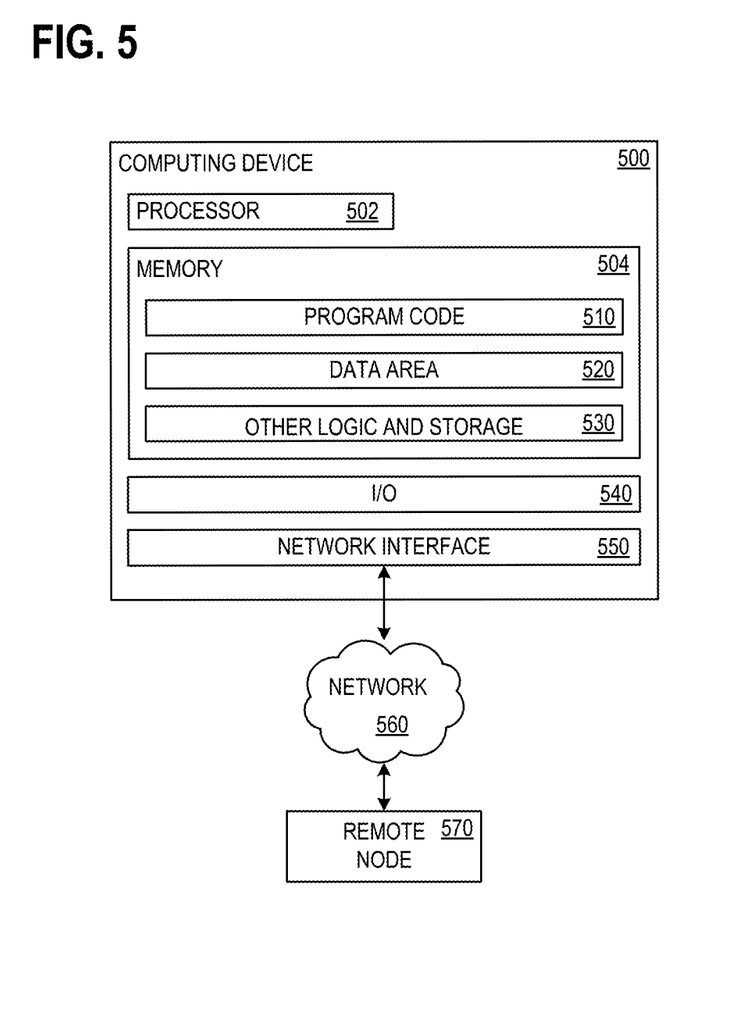
FIG. 5 illustrates a block diagram of a computing device that may be used as a component of the arrangement illustrated in FIG. 1.

FIG. 5 illustrates a block diagram of computing device 500 that may be used within arrangement 100 of FIG. 1, for example as a portion of UE 102, UE 104, RAN 112, core 116, network node 120, session management node 130, policy nodes 140a-140c, and/or any other component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An exemplary system for initiating a network session for a UE on a network comprises: a processor; and a computer-readable medium storing instructions that are operative upon execution by the processor to: receive a session initiation message at a first network node; append, to the session initiation message, an identification of a policy node; pass the appended session initiation message to a session management node; select, by the session management node, the identified policy node; and based at least upon selecting the identified policy node, initiate the network session for the UE.

An exemplary method of initiating a network session for a UE on a network comprises: receiving a session initiation message at a first network node; appending, to the session initiation message, an identification of a policy node; passing the appended session initiation message to a session management node; selecting, by the session management node, the identified policy node; and based at least upon selecting the identified policy node, initiating the network session for the UE.

One or more exemplary computer storage devices has computer-executable instructions stored thereon for initiating a network session for a UE on a network, which, on execution by a computer, cause the computer to perform operations comprising: receiving a session initiation message at a first network node; appending, to the session initiation message, an identification of a policy node; passing the appended session initiation message to a session management node; selecting, by the session management node, the identified policy node; and based at least upon selecting the identified policy node, initiating the network session for the UE.

Alternatively, or in addition to the other examples described herein, examples include any combination of the following:
  the network session comprises a voice call;
  the session initiation message comprises a SIP message;
  the session management node comprises a P-CSCF node;
  the identification of the policy node comprises an IP address;
  the identification of the policy node comprises an FQDN;
  the policy node comprises a PCRF node;
  the first network node comprises a PGW;
  the policy node comprises a PCF node;
  the first network node comprises a SMF node;
  receiving the session initiation message comprises receiving the session initiation message from the UE;
  appending, to the session initiation message, the identification of the policy node comprises appending by the first network node;
  the network session comprises a VOLTE call;
  the network session comprises a VONR call;
  the first network node communicates with the identified policy node using a Gx interface;
  the first network node communicates with the identified policy node using an N7 interface; and
  the session management node communicates with the identified policy node using an Rx interface.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of initiating a network session for a user equipment (UE) on a network, the method comprising:
    receiving a session initiation protocol (SIP) register message at a first session management function (SMF) node;
    appending, by the SMF node, to the SIP register message, an identification of a policy charging function (PCF) node;
    passing, by the SMF node, the appended SIP register message from the SMF node to a proxy-call session control function (P-CSCF) node, without passing the appended SIP register message through the UE;
    extracting, by the P-CSCF node, the identification of the PCF node from the appended SIP register message;
    selecting, by the P-CSCF node, the identified PCF node in accordance with the extracted identification of the PCF node; and
    based at least upon selecting the identified PCF node, initiating the network session for the UE.

2. The method of claim 1, wherein the network session comprises a voice call.

3. The method of claim 2, wherein the network session comprises a voice over long term evolution (VOLTE) call or a voice over new radio (VONR) call.

4. The method of claim 1, wherein the identification of the PCF node comprises a fully qualified domain name (FQDN).

5. The method of claim 1, wherein receiving the SIP register message comprises receiving the SIP register message from the UE, and wherein the SMF node communicates with the identified PCF node using an N7 interface.

6. The method of claim 1, wherein a connection between the P-CSCF node and the identified PCF node is an Rx interface.

7. The method of claim 1, further comprising:
    sending, by the SMF node, an initial credit-control-request (CCR-I) to the identified PCF node.

8. The method of claim 1, further comprising:
    extracting, by the P-CSCF node, the identification of the PCT node from the appended SIP register message.

9. A system for initiating a network session for a user equipment (UE) on a network, the system comprising:
    a processor; and
    a computer-readable medium storing instructions that are operative upon execution by the processor to:
        receive a session initiation protocol (SIP) register message at a session management function (SMF) node;
        append, by the SMF node, to the SIP register message, an identification of a policy charging function (PCF) node;
        pass, by the SMF node, the appended SIP register message from the SMF node to a proxy-call session control function (P-CSCF) node, without passing the appended SIP register message through the UE;
        extract, by the P-CSCF node, the identification of the PCF node from the appended SIP register message;
        select, by the P-CSCF node, the identified PCF node in accordance with the extracted identification of the PCF node; and
        based at least upon selecting the identified PCF node, initiate the network session for the UE.

10. The system of claim 9, wherein the network session comprises a voice call.

11. The system of claim 10, wherein the network session comprises a voice over long term evolution (VOLTE) call or a voice over new radio (VONR) call.

12. The system of claim 9, wherein the identification of the PCF node comprises a fully qualified domain name (FQDN).

13. The system of claim 9, wherein receiving the SIP register message comprises receiving the SIP register message from the UE, and wherein the SMF node communicates with the identified PCF node using an N7 interface.

14. The system of claim 9, wherein a connection between the P-CSCF node and the identified PCF node is an Rx interface.

15. The system of claim 9, wherein the instructions are further operative to:
    send, by the SMF node, an initial credit-control-request (CCR-I) to the identified PCF node.

16. The system of claim 9, wherein the instructions are further operative to:
    extract, by the P-CSCF node, the identification of the PCT node from the appended SIP register message.

17. One or more computer storage devices having computer-executable instructions stored thereon for initiating a network session for a user equipment (UE) on a network, which, on execution by a computer, cause the computer to perform operations comprising:
    receiving a session initiation protocol (SIP) register message at a session management function (SMF) node;
    appending, by the SMF node, to the SIP register message, and identification of a poly charging function (PCT) node;
    passing, by the SMF node, the appended SIP register message from the SMF node to a proxy-call session control function (P-CSCF) node, without passing the appended SIP register message through the UE;
    extracting, by the P-CSCF node, the identification of the PCF node from the appended SIP register message;
    selecting, by the P-CSCF node, the identified PCF node in accordance with the extracted identification of the PCF node; and
    based at least upon selecting the identified PCF node, initiating the network session for the UE.

18. The one or more computer storage devices of claim 17, wherein
    the network session comprises a voice over long term evolution (VOLTE) call or a voice over new radio (VONR) call;
    the identification of the PCF node comprises a fully qualified domain name (FQDN);
    receiving the SIP register message comprises receiving the SIP register message from the UE; and
    the SMF node communicates with the identified PCF node using an N7 interface.

19. The one or more computer storage devices of claim 17, wherein a connection between the P-CSCF node and the identified PCF node is an Rx interface.

20. The one or more computer storage devices of claim 17, wherein the operations further comprising:

extracting, by the P-CSCF node, the identification of the PCT node from the appended SIP register message; and sending, by the SMF node, an initial credit-control-request (CCR-I) to the identified PCF node.

\* \* \* \* \*